United States Patent Office  3,333,943
Patented Aug. 1, 1967

3,333,943
HERBICIDAL COMPOSITIONS
Sidney B. Richter, Chicago, and Alfred A. Levin, Skokie, Ill., assignors to Velsicol Chemical Corporation, Chicago, Ill., a corporation of Illinois
No Drawing. Filed Oct. 13, 1964, Ser. No. 403,654
22 Claims. (Cl. 71—100)

This invention relates to new herbicidal compositions. In particular, to new herbicidal compositions which are effective in the control of a broad spectrum of weeds.

Prior to the present invention many organic and inorganic substances have been proposed and used in attempts to control weeds. While some of these substances are partially successful, the problem of controlling the vast number of species of undesirable plant life still exists. The previously proposed substances are effective in the control of certain weeds, but no compound or composition has been discovered which can effectively control all the species of weeds without being excessively toxic and indiscriminately destroying both desirable and undesirable plant life.

It is therefore, one object of the present invention to provide herbicidal compositions for the control of a broad spectrum of weeds.

It is a further object of the present invention to provide herbicidal compositions capable of being applied to crops at rates compatible to the crops and which are effective in the control of a broad spectrum of weeds.

These and other objects of the present invention will be readily apparent from the ensuing description.

Herbicidally active substituted pyridazone compounds and compounds of the general formula:

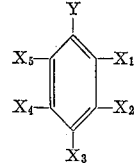

wherein $X_1$, $X_2$, $X_3$, $X_4$, and $X_5$ are independently selected from the group consisting of chlorine, methyl, sec-butyl, sec-amyl, methoxy, nitro, amino, phenyl and hydrogen; and Y is selected from the group consisting of —OH, —O(CH$_2$)$_n$COOH and —COOH wherein $n$ is an integer from one to three; and the alkali metal salts, ammonium salts, amides and esters thereof have been found to be generally effective in the control of certain weeds such as dock, mustard, pigweed, velvet leaf, spike rush and the like but generally fail to destory other weeds such as barnyard grass, crabgrass, downy brome, foxtail, ryegrass, wild oats and the like. Various of these herbicides, have been tried in an attempt to control the entire wide spectrum of weeds at rates which are non-injurious to crops, but the attempts have failed and the weeds continue to thrive, causing substantial economic losses through crop damage and associated losses.

Unexpectedly it has been discovered that the use of combinations of compounds of the formula:

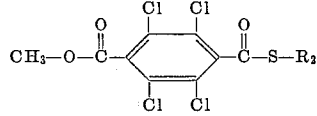

wherein $R_2$ is lower alkyl, preferably containing one to three carbon atoms, with a compound selected from the group consisting of substituted pyridazone herbicides and herbicidally active compounds of the formula:

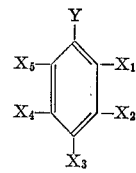

wherein $X_1$, $X_2$, $X_3$, $X_4$, $X_5$ and Y are as described above, and the salts, amides and esters thereof, preferably containing one to ten carbon atoms, provide herbicidal compositions which are effective in the control of a broad spectrum of weeds and which give results which are unattainable at comparable rates with separate compositions of the individual heribicides.

Though generally, the herbicidal compositions of the present invention include combinations of two compounds, it is within the scope of this invention to include more than two compounds in the compositions.

Exemplary herbicides which are suitable for use in combination with the methyl S-alkyl 2,3,5,6-tetrachloromonothioterephthalates to form the compositions of the present invention are: 2,4-dichlorophenoxyacetic acid, 2,4,5-trichlorophenoxyacetic acid, 2-methyl-4-chlorophenoxyacetic acid, 3,4-dichlorophenoxyacetic acid, p-chlorophenoxyacetic acid, allyl 2-methyl-4-chlorophenoxyacetate, 2-(2-methyl-4-chlorophenoxy)propionic acid, 4-(2-methyl-4-chlorophenoxy)butyric acid, 2,3,6-trichlorobenzoic acid, 2,3,5,6-tetrachlorobenzoic acid, 2-methoxy-3,6-dichlorobenzoic acid, 2-methoxy-3,5,6-trichlorobenzoic acid, 3-amino-2,5-dichlorobenzoic acid, 3-nitro-2,5-dichlorobenzoic acid, 2-methoxy-3-nitro-5-chlorobenzoic acid, 5-amino-4-chloro-2-phenyl-3(2H)-pyridazone, 2,4-dinitro-6-sec-butylphenol, 2,4-dinitro-6-sec-amylphenol, 2,4-dinitro-6-methylphenol and the like. For the purpose of formulation, these compounds are often employed in the form of their alkali metal salts, ammonium salts, amides and esters because these salts, amides and esters are generally more soluble than the compounds in the form of their acids. These salts, amides and esters generally have activity equivalent to the corresponding acids. Examples of suitable alkali metal salts, ammonium salts, amides and esters useful in the formulation of the herbicidal compositions of the present invention are: potassium 2,4-dichlorophenoxyacetate, sodium 2,4-dichlorophenoxyacetate, ammonium 2,4-dichlorophenoxyacetate, 2,4-dichlorophenoxyacetamide, n-propyl 2,4-dichlorophenoxyacetate, isopropyl 2,4-dichlorophenoxyacetate, n-butyl 2,4-dichlorophenoxyacetate, isooctyl 2,4-dichlorophenoxyacetate, potassium 2,4,5-trichlorophenoxyacetate, sodium 2,4,5-trichlorophenoxyacetate, ammonium 2,4,5-trichlorophenoxyacetate, 2,4,5-trichlorophenoxyacetamide, n-propyl 2,4,5-trichlorophenoxyacetate, isopropyl 2,4,5-tricholophenoxyacetate, n-butyl 2,4,5-trichlorophenoxyacetate, isooctyl 2,4,5-trichlorophenoxyacetate, potassium 2-methyl-4-chlorophenoxyacetate, sodium 2 - methyl - 4 - chlorophenoxyacetate, ammonium 2-methyl-4-chlorophenoxyacetate, 2-methyl-4-chlorophenoxyacetamide, n-propyl 2- methyl-4-chlorophenoxyacetate, isopropyl 2-methyl-4-chlorophenoxyacetate, n-butyl 2-methyl-4-chlorophenoxyacetate, isooctyl 2-methyl-4-chlorophenoxyacetate, potassium 2-methoxy-3,6-dichlorobenzoate, sodium 2-methoxy-3,6-dichlorobenzoate, ammonium 2-methoxy-3,6-dichlorobenzoate, 2-methoxy-3,6-dichlorobenzamide, n-propyl 2-methoxy-3,6-dichlorobenzoate, isopropyl 2-methoxy-3,6-dichlorobenzoate, n-butyl 2-methoxy-3,6-dichlorobenzoate, isooctyl 2-methoxy-3,6-dichlorobenzoate, potassium 2,4-dinitro-6-sec-butylphenoxide, sodium 2,4-dinitro-6-sec-butylphenoxide, ammonium 2,4-dinitro-6-sec-butylphenoxide, ethanolamine 2,4-dinitro-6-sec-butylphenoxide, isopropanolamine 2,4-dinitro-6-sec-butylphenoxide, potassium 2,4-dinitro-6-sec-amylphenoxide, sodium 2,4-dinitro-6-sec-amylphenoxide, ammonium 2,4-dinitro-6-sec-amylphenoxide, ethanolamine 2,4-dinitro-6-sec-amylphenoxide, isopropanol 2,4-dinitro-6-sec-amylphenoxide and the like.

The methyl S-alkyl 2,3,5,6-tetrachloromonothioterephthalates described above can readily be prepared employing the known compound 2,3,5,6-tetrachloroterephthaloyl chloride as the starting material. The group

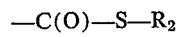

can be introduced by treating each molar proportion of the tetrachloroterephthaloyl chloride with a molar proportion of the mercaptan H—S—R$_2$, wherein R$_2$ is as defined above. Ordinarily, it is preferred to use the mercaptan in the form of one of its alkali metal salts for convenience in handling. Sodium methyl mercaptan, sodium ethyl mercaptan, sodium n-propyl mercaptan and sodium isopropyl mercaptan are good reagents for this reaction.

Once the group —C(O)—S—R$_2$ has been introduced into the molecule of the intermediate, the group

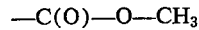

can be introduced readily. For example, the intermediate already containing the —C(O)—S—R$_2$ group but still having one —C(O)—Cl group can be reacted with methanol.

An alternative method for the production of the methyl S-alkyl 2,3,5,6-tetrachloromonothioterephthalates is to employ as the starting materials corresponding dialkyl 2,3,5,6-tetrachloroterephthalates which can be prepared in the manner described in Rabjohn, J. Am. Chem. Soc. 70, 3518 (1948). This starting material is subjected to hydrolysis with an equimolar amount of a suitable base such as potassium hydroxide, sodium hydroxide and the like. The hydrolysis reaction is performed in a solvent, such as dioxane, benzene or dioxane-methanol solution, at the reflux temperature of the solvents-reactants mixture. The resulting half-ester acid is recovered from the mixture by pouring the mixture into water, extracting the unreacted diester with an appropriate organic solvent such as diethyl ether and acidifying the aqueous fraction to yield the desired material which is then chlorinated with a suitable chlorinating agent such as thionyl chloride, phosphorus pentachloride, and the like to produce a half-ester acyl chloride. Chlorination is conveniently effected without a solvent when thionyl chloride is used as the chlorinating agent or at the reflux temperature of the solvent if a solvent is necessary. The crude half-ester acyl chloride is recovered from the reaction mixture by removing the chlorinating agent, for example by heating in vacuo. This crude product can be purified or can be used as such to react with an appropriate mercaptan of the formula HSR$_2$, wherein R$_2$ is as described above. Each molar proportion of the half-ester half-acyl chloride is treated with a molar proportion of a mercaptan either in the presence of a base or as the alkali metal salt. Ordinarily, it is preferred to use the mercaptan in the form of an aqueous solution of one of its alkali metal salts for convenience in handling. Sodium n-propyl mercaptan, potassium n-propyl mercaptan, sodium isopropyl mercaptan and potassium isopropyl mercaptan are good reagents for this reaction.

The reactions discussed above are ordinarily carried out in the presence of suitable inert solvents. The temperatures at which the reactions can be carried out are not critical. Generally, temperatures of from about normal room temperature to about the normal reflux temperature of the reaction mixture are preferred. While the reactions are normally carried out at atmospheric pressure, sub- or super-atmospheric pressures can also be used. The crude reaction product containing the new compounds used in the present invention is often pure enough for use in the herbicidal compositions as such; but the compounds can be purified, if desired, by any of the recognized techniques known to the art, such as fractional distillation, crystallization from suitable solvents or chromatography.

EXAMPLE 1

*Preparation of the S-methyl ester of 4-thiocarboxy-2,3,5, 6-tetrachlorobenzoyl chloride*

An aqueous solution (193 g.) of the sodium salt of methyl mercaptan (0.37 mole) was added with rapid stirring to a solution of 2,3,5,6-tetrachloroterephthaloyl chloride (250 g.; 0.74 mole) in 1800 ml. dioxane in a 5-1, 3-necked flask fitted with a mechanical stirrer and reflux condenser. The mixture was stirred overnight at room temperature, filtered through magnesium sulfate, and allowed to stand. The solvent was then stripped in vacuo to give 205 g. of residue, which was distilled at 134–7° C./0.1 mm. (much decomposition) to give 85 g. of the S-methyl ester of 4-thiocarboxy-2,3,5,6-tetrachlorobenzoyl chloride. A portion of the product was crystallized from heptane to give an analytical sample, M.P. 108–9° C.

Analysis for $C_9H_3Cl_5O_2S$.—Theory percent: C, 30.67; H, 0.86; Cl, 50.30; S, 9.10. Found percent: C, 30.83; H, 0.90; Cl, 50.31; S, 8.76.

EXAMPLE 2

*Preparation of methyl S-methyl 2,3,5,6-tetrachloromonothioterephthalate*

A mixture of the S-methyl ester of 4-thiocarboxy-2,3,5,6-tetrachlorobenzoyl chloride (8 g.; 0.022 mole) and 30 ml. methanol was refluxed overnight and cooled. The solid which formed was filtered off and dried to give 7 g. (91% of theory) of methyl S-methyl 2,3,5,6-tetrachloromonothioterephthalate, M.P. 142–3°. A sample was recrystallized from methanol and dried for analysis.

Analysis for $C_{10}H_6Cl_4O_3S$.—Theory percent: S, 9.21. Found percent: S, 8.72.

EXAMPLE 3

*Preparation of 4-carbomethoxy-2,3,5,6-tetrachlorobenzoic acid*

Dimethyl 2,3,5,6-tetrachloroterephthalate (65 g.; 0.2 mol) dissolved in dioxane (400 ml.) was placed into a 1 liter, three-necked flask equipped with a mechanical stirrer, reflux condenser and heating mantle. Potassium hydroxide (10.9 g.; 0.2 mol) in 130 ml. of 3:2 dioxane-methanol solution was added to the flask. The mixture was heated at reflux with stirring for six hours and then poured into one liter of cold water to precipitate the unreacted dimethyl 2,3,5,6-tetrachloroterephthalate, which upon extraction from the aqueous solution with diethyl ether and stripping of the ether yielded 33.8 g. (0.1 mol) of unreacted dimethyl 2,3,5,6-tetrachloroterephthalate. The aqueous solution was acidified with hydrochloric acid yielding an oil, which was dissolved in diethyl ether. The ethereal solution was separated from the aqueous mixture, washed with cold water, dried over magnesium sulfate, filtered free of drying agent, and stripped of diethyl ether by heating in vacuo to yield an oil, which upon trituration with pentane yielded a yellow solid. The solid was recrystallized from benzene-pentane to yield 4-carbomethoxy-2,3,5,6-tetrachlorobenzoic acid melting 167–9° C., in an 82.7% yield based on recovered starting material. The half-ester acid had the following elemental analysis:

Analysis for $C_9H_4Cl_4O_4$.—Theoretical percent: C, 34.00; H, 1.27. Found percent: C, 34.65; H, 1.29.

EXAMPLE 4

*Preparation of 4-carbomethoxy-2,3,5,6-tetrachlorobenzoyl chloride*

A mixture of 4-carbomethoxy-2,3,5,6-tetrachlorobenoic acid (8.5 g.; 0.027 mol), prepared as described in Example 1, and thionyl chloride (50 ml.) was heated at reflux for 16 hours. The mixture was then cooled and excess thionyl chloride removed by heating under reduced pressure to yield an oil which solidified on standing. The solid was triturated with a small amount of pentane to yield crude acyl chloride melting at 82–4° C. in a 74.4% yield. The crude material had the following elemental analysis:

Analysis for $C_9H_3O_3Cl_5$.—Theoretical percent: C, 32.13; H, 0.9. Found percent: C, 33.13; H, 1.28.

EXAMPLE 5

*Preparation of methyl S-isopropyl 2,3,5,6-tetrachloromonothioterephthalate*

An aqueous solution (66 g.) of the sodium salt of isopropyl mercaptan (0.16 mol) was added with rapid stirring to a solution of 4-carbomethoxy-2,3,5,6-tetrachlorobenzoyl chloride (30 g.; 0.08 mol), prepared as described in Example 2, in 100 ml. of dioxane in a 250 ml., round bottom, 3-necked flask fitted with a mechanical stirrer and reflux condenser. The mixture was stirred overnight at room temperature. The aqueous layer was separated and the dioxane layer dried over magnesium sulfate, and allowed to stand. The drying agent was filtered and the solvent was then stripped in vacuo to give an oil. The oil was allowed to stand and solidify. The solid was then dissolved in methanol, and the solution was cooled. The solid which precipitated was filtered off and dried. The solid was recrystallized from heptane and dried to yield the desired product, methyl-S-isopropyl 2,3,5,6-tetrachloromonothioterephthalate, M.P. 117–19° C.

Analysis for $C_{12}H_{10}O_3Cl_4S$.—Theoretical percent: C, 38.32; H, 2.69; Cl, 37.71; S, 8.52. Found percent: C, 38.83; H, 2.82; Cl, 37.23; S, 8.69.

EXAMPLE 6

*Preparation of methyl S-n-propyl 2,3,5,6-tetrachloromonothioterephthalate*

A solution (60 g.) of the sodium salt of n-propyl mercaptan (0.15 mol) was added with stirring to a solution of 4-carbomethoxy-2,3,5,6-tetrachlorobenzoyl chloride (25 g.; 0.075 mol), prepared as described in Example 2, in 100 ml. of dioxane in a 250 ml. flask fitted with a mechanical stirrer and reflux condenser. The mixture was stirred overnight at room temperature, and a solid formed. The solid was filtered and the filtrate poured into a separatory funnel. The aqueous layer was drawn off and the dioxane layer dried over magnesium sulfate. The drying agent was filtered and the solvent striped to yield an oil. The oil was allowed to stand and solidify. The solid was then crystallized from methanol, filtered, and dried to yield the desired product, methyl S-n-propyl 2,3,5,6-tetrachloromonothioterephthalate, M.P. 65.5–7° C.

Analysis for $C_{12}H_{10}O_3Cl_4S$.—Theoretical percent: C, 38.32; H, 2.69; Cl, 37.71; S, 8.52. Found percent: C, 38.18; H, 2.81; Cl, 37.08; S, 8.81.

The herbicidal compositions of the present invention include, in herbicidally effective amounts, as essential active constituents an methyl S-alkyl 2,3,5,6-tetrachloromonothioterephthalate such as methyl S-methyl 2,3,5,6-tetrachloromonothioterephthalate, methyl S-ethyl 2,3,5,6-tetrachloromonothioterephthalate, methyl S-isopropyl 2,3,5,6-tetrachloromonothioterephthalate, methyl S-n-propyl 2,3,5,6-tetrachloromonothioterephthalate, and the like; and a compound of the formula:

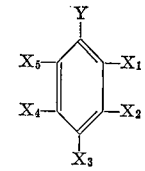

wherein $X_1$, $X_2$, $X_3$, $X_4$, $X_5$, and $Y$ are as described above and the salts, amides and esters thereof, preferably containing one to ten carbon atoms. These active constituents are generally incorporated into chemical formulations. These formulations can be solids such as dusts, granules, or wettable powders, or they can be liquids such as solutions or emulsifiable concentrates. The concentration of the active compounds in the herbicidal compositions of this invention will vary greatly with the type of formulation and the purpose for which it is designed, but generally the herbicidal compositions will comprise from about 0.05 to about 95 percent by weight of the active compounds. In a preferred embodiment of this invention, the herbicidal compositions will comprise from about 5 to about 75 percent by weight of the active compounds. The compositions can also comprise such additional substances as other pesticides, spreaders, adhesives, stickers, fertilizers, activators, synergists, and the like.

One method for the preparation of the herbicidal compositions of the present invention comprises mixing the essential active constituents, described above, with sufficient water to form a paste, forming granules from said paste, and drying said granules.

The active constituents and a finely divided carrier are combined and blended together in any suitable apparatus known to the art. The granules can be formed without the use of an organic solvent although small amounts of such organic solvents can be used if desired. The amounts of such solvent should not exceed about 5% by weight of the active constituents and carrier mixture before the addition of water, and preferably the amount should not be greater than 2% on the same weight basis. Other materials such as wetting agents, binders, deactivators and the like can also be used if desired.

The finely divided carrier to be used in preparing the granules can be one or more of the materials conventionally used in preparing dusts or granules as they are known in the art. These carriers are usually solids of the class consisting of the attapulgite clays, montmorillonite clays, diatomaceous earths and vermiculites. For example, the attapulgite clays include such materials as fuller's earth, attapulgite, and sepiolite; the montmorillonite clays include such materials as beidellite, nontronite, montmorillonite, hectorite, saponite, sauconite and bentonite; the diatomaceous earths include such materials as diatomite and kieselguhr; and the vermiculites include such materials as biotite. Other solids such as talc, pumice, volcanic sand, charcoal, inorganic phosphates, magnesium carbonates, corn cobs, and tobacco have also been used in the preparation of granules.

It is preferred that the finely divided carrier be in dust form for ready formation of a paste and that it have a particle size less than about 8 mesh U.S. sieve. However, carriers having larger particle size can be used since they can be ground in the process of forming the paste.

The dry mixture of the herbicides and the finely divided carrier can comprise a variety of quantities of the herbicides. Preferred pesticide granules will contain up to about 50% by weight of the herbicides. In a most preferred embodiment, the granules will contain from about 2% to about 25% by weight of the herbicides. The quantity of herbicides to be mixed with the finely divided carrier will therefore be approximately the same as desired in the finished granules after drying. However, it has been found that many of the suitable carriers contain naturally a certain amount of moisture which may be driven off as the granules are dried. Hence, the finished granules will often contain a slightly higher concentration of the herbicides than does the original mixture of herbicides and carrier before water is added.

After the herbicides and the finely divided carrier with any other adjuvants are combined and blended, or additionaly ground to a finer particle size, if necessary, sufficient water is added in order that a workable paste will form. The exact quantity of water to be used will depend on the particular nature of the herbicides and carrier and the proportions in which they are combined. However, it has been found that about one part by weight of water to each two parts by weight of the mixture of heribicides and carrier is preferred.

The paste obtained in the manner described is then extruded and pelletized by techniques and with apparatus known to the art. The paste is extruded into pellets of a particle size which is selected on the basis of the particular herbicides and the use for which it is intended. Generally, these pellets should be in about the 8 to 60 mesh U.S. sieve size.

After extruding, the pellets are dried to give the finished herbicidal granules. The drying can be accelerated by heating, and temperatures up to about 150° F. are preferred. The drying can also be accelerated by carrying out the heating under reduced pressure.

The preparation of these herbicidal granules is illustrated in the following examples, in which all proportions are by weight. Methyl S-methyl 2,3,5,6-tetrachloromonothioterephthalate is represented for brevity as Compound A.

EXAMPLE 8

*Preparation of a granule containing 5% Compound A and 10% 2,4-dichlorophenoxyacetic acid*

The following materials are blended together in the percentage proportions indicated:

| | Percent |
|---|---|
| Compound A (90%) | 5.6 |
| 2,4-dichlorophenoxyacetic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 2,4-dichlorophenoxyacetic acid.

EXAMPLE 9

*Preparation of a granule containing 5% Compound A and 10% 2,4,5-trichlorophenoxyacetic acid*

The following materials are blended together in the percentage proportions indicated:

| | Percent |
|---|---|
| Compound A (90%) | 5.6 |
| 2,4,5-trichlorophenoxyacetic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 2,4,5-trichlorophenoxyacetic acid.

EXAMPLE 10

*Preparation of a granule containing 5% Compound A and 10% 2-methyl-4-chlorophenoxyacetic acid*

The following materials are blended together in the percentage proportions indicated:

| | Percent |
|---|---|
| Compound A (90%) | 5.6 |
| 2-methyl-4-chlorophenoxyacetic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 2-methyl-4-chlorophenoxyacetic acid.

EXAMPLE 11

*Preparation of a granule containing 5% Compound A and 10% 2-(2-methyl-4-chlorophenoxy)propionic acid*

The following materials are blended together in the percentage proportions indicated:

| | Percent |
|---|---|
| Compound A (90%) | 5.6 |
| 2 - (2 - methyl - 4 - chlorophenoxy)propinoic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 2-(2-methyl-4-chlorophenoxy)propionic acid.

EXAMPLE 12

*Preparation of a granule containing 5% Compound A and 10% 4-(2-methyl-4-chlorophenoxy)butyric acid*

The following materials are blended together in the percentage proportions indicated:

| | Percent |
|---|---|
| Compound A (90%) | 5.6 |
| 4 - (2 - methyl - 4 - chlorophenoxy)butyric acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 4-(2-methyl-4-chlorophenoxy)butyric acid.

EXAMPLE 13

*Preparation of a granule containing 5% Compound A and 10% 3,4-dichlorophenoxyacetic acid*

The following materials are blended together in the percentage proportions indicated:

| | Percent |
|---|---|
| Compound A (90%) | 5.6 |
| 3,4-dichlorophenoxyacetic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 3,4-dichlorophenoxyacetic acid.

EXAMPLE 14

*Preparation of a granule containing 5% Compound A and 10% p-chlorophenoxyacetic acid*

The following materials are blended together in the percentage proportions indicated:

| | Percent |
|---|---|
| Compound A (90%) | 5.6 |
| p-Chlorophenoxy acetic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% p-chlorophenoxyacetic acid.

EXAMPLE 15

*Preparation of a granule containing 5% Compound A and 10% 2,3,6-trichlorobenzoic acid*

The following materials are blended together in the percentage proportions indicated:

| | Percent |
|---|---|
| Compound A (90%) | 5.6 |
| 2,3,6-trichlorobenzoic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 2,3,6-trichlorobenzoic acid.

EXAMPLE 16

*Preparation of a granule containing 5% Compound A and 10% 2,3,5,6-tetrachlorobenzoic acid*

The following materials are blended together in the percentage proportions indicated:

| | Percent |
|---|---|
| Compound A (90%) | 5.6 |
| 2,3,5,6-tetrachlorobenzoic acid (95%) | 10.5 |
| Nadex 771 dextrin binder | 5.0 |
| Diluex attapulgite clay | 78.9 |

The above mixture is blended with sufficient water to form a thick paste, which is extruded, pelletized and dried to give granules containing about 5% Compound A and about 10% 2,3,5,6-tetrachlorobenzoic acid.

EXAMPLE 17

*Preparation of a granule containing 10% Compound A and 10% 2-methoxy-3,6-dichlorobenzoic acid*

The following materials are blended together in the percentage proportions indicated:

| | Percent |
|---|---|
| Compound A (90%) | 11.1 |
| 2-methoxy-3,6-dichlorobenzoic acid (85%) | 11.8 |
| Nadex 771 dextrin binder | 5.0 |
| Diluex attapulgite clay | 72.1 |

The above mixture is blended with sufficient water to form a thick paste, which is extruded, pelletized and dried to give granules containing about 10% Compound A and about 10% 2-methoxy-3,6-dichlorobenzoic acid.

EXAMPLE 18

*Preparation of a granule containing 10% Compound A and 10% 2-methoxy-3,5,6-trichlorobenzoic acid*

The following materials are blended together in the percentage proportions indicated:

| | Percent |
|---|---|
| Compound A (90%) | 11.1 |
| 2-methoxy-3,5,6-trichlorobenzoic acid (85%) | 11.8 |
| Nadex 771 dextrin binder | 5.0 |
| Diluex attapulgite clay | 72.1 |

The above mixture is blended with sufficient water to form a thick paste, which is extruded, pelletized and dried to give granules containing about 10% Compound A and about 10% 2-methoxy-3,5,6-trichlorobenzoic acid.

EXAMPLE 19

*Preparation of a granule containing 10% Compound A and 10% 3-amino-2,5-dichlorobenzoic acid*

The following materials are blended together in the percentage proportions indicated:

| | Percent |
|---|---|
| Compound A (90%) | 11.1 |
| 3-amino-2,5-dichlorobenzoic acid (85%) | 11.8 |
| Nadex 771 dextrin binder | 5.0 |
| Diluex attapulgite clay | 72.1 |

The above mixture is blended with sufficient water to form a thick paste, which is extruded, pelletized and dried to give granules containing about 10% Compound A and about 10% 3-amino-2,5-dichlorobenzoic acid.

EXAMPLE 20

*Preparation of a granule containing 10% Compound A and 10% 3-nitro-2,5-dichlorobenzoic acid*

The following materials are blended together in the percentage proportions indicated:

| | Percent |
|---|---|
| Compound A (90%) | 11.1 |
| 3-nitro-2,5-dichlorobenzoic acid (85%) | 11.8 |
| Nadex 771 dextrin binder | 5.0 |
| Diluex attapulgite clay | 72.1 |

The above mixture is blended with sufficient water to form a thick paste, which is extruded, pelletized and dried to give granules containing about 10% Compound A and about 10% 3-nitro-2,5-dichlorobenzoic acid.

EXAMPLE 21

*Preparation of a granule containing 10% Compound A and 10% 5-amino-4-chloro-2-phenyl-3(2H)-pyridazone*

The following materials are blended together in the percentage proportions indicated:

| | Percent |
|---|---|
| Compound A (90%) | 11.1 |
| 5 - amino - 4 - chloro - 2 - phenyl-3(2H)-pyridazone (85%) | 11.8 |
| Nadex 771 dextrin binder | 5.0 |
| Diluex attapulgite clay | 72.1 |

The above mixture is blended with sufficient water to form a thick paste, which is extruded, pelletized and dried to give granules containing about 10% Compound A and about 10% 5-amino-4-chloro-2-phenyl-3(2H)-pyridazone.

The herbicidal activity of the compositions of the present invention was illustrated in tests conducted in rice fields. The compositions exhibited results in these experiments indicating a high order of herbicidal activity with a concomitant non-toxic effect on rice. More particularly, the experiments were carried out in a rice paddy field where weeds such as barnyard grass and various broad leaf weeds were present. The 6.6 square meter field was covered to a depth of 2 cm. Paddy rice was transplanted to this field. Six days after transplanting, test compositions containing the amount of test compounds indicated below and also 1% polyvinyl alcohol and 3% sodium alkyl benzene sulfonate were applied to the field. The herbicidal effect to the weeds and the phytotoxicity to the rice plants was determined twenty days after application of the test compositions. Some of the compositions and results follow. (Methyl S-methyl 2,3,5,6-tetrachloromonothioterephthalate is represented for brevity as Compound A.)

TABLE

| Test Plot | Test Compound | Concn. (in actual grams per ¼ acre) | Number of Barnyard Grass Plants Remaining after treatment | Number of Broad Leaf Weeds Remaining after treatment | [1] Emergence of Spike Rush | [2] Phytotoxicity to Rice Plants |
|---|---|---|---|---|---|---|
| 1 | Compound A | 500 | 27 | 172 | 3 | 0 |
| 2 | Compound A / 2-methyl-4-chlorophenoxyacetic acid | 250 / 25 | 7 | 12 | 1 | 0 |
| 3 | Compound A / 2-methyl-4-chlorophenoxyacetic acid | 100 / 45 | 5 | 0 | 0 | 0 |
| 4 | 2-methyl-4-chlorophenoxyacetic acid | 80 | 196 | 7 | 0 | 3 |
| 5 | Compound A / 2-(2-methyl-4-chlorophenoxy)-propionic acid | 250 / 25 | 4 | 11 | 0 | 0 |
| 6 | Compound A / 2-(2-methyl-4-chlorophenoxy)-propionic acid | 100 / 45 | 0 | 0 | 0 | 0 |
| 7 | 2-(2-methyl-4-chlorophenoxy)-propionic acid | 80 | 132 | 2 | 1 | 2 |
| 8 | Compound A / 4-(2-methyl-4-chlorophenoxy)-butyric acid | 250 / 25 | 0 | 4 | 1 | 0 |
| 9 | Compound A / 4-(2-methyl-4-chlorophenoxy)-butyric acid | 100 / 45 | 2 | 2 | 0 | 0 |
| 10 | 4-(2-methyl-4-chlorophenoxy)-butyric acid | 80 | 112 | 9 | 0 | 2 |
| 11 | Compound A / 2,4-dinitro-6-sec-butylphenol | 250 / 30 | 0 | 2 | 0 | 0 |
| 12 | Compound A / 2,4-dinitro-6-sec-butylphenol | 100 / 50 | 0 | 0 | 0 | 0 |
| 13 | 2,4-dinitro-6-sec-butylphenol | 100 | 47 | 25 | 0 | 2 |
| 14 | Control | 0 | 312 | 97 | 3 | 0 |

[1] Emergence of Spike Rush was evaluated on a 0 to 3 scale as follows: 0=no emergence and 3=marked emergence.
[2] Phytotoxicity to rice was evaluated on a 0 to 3 scale as follows: 0=no phytotoxicity and 3=severe phytotoxicity.

We claim:

1. A herbicidal composition including, as essential active constituents, a herbicidal amount of a compound of the formula:

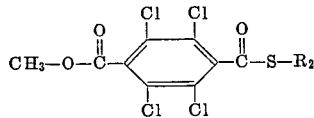

wherein $R_2$ is lower alkyl; and a herbicidal amount of a herbicidally active compound of the formula:

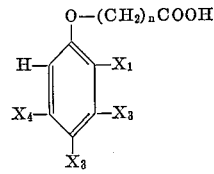

wherein $X_1$, $X_2$, $X_3$, $X_4$ and $X_5$ are independently selected from the group consisting of chlorine, methyl, sec-butyl, sec-amyl, methoxy, nitro, amino, phenyl and hydrogen; and Y is selected from the group consisting of —OH, —O(CH$_2$)$_n$COOH, and —COOH wherein $n$ is an integer from one to three; and the salts, amides and esters thereof.

2. A herbicidal composition including, as essential active constituents, a herbicidal amount of a compound of the formula:

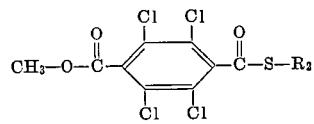

wherein $R_2$ is lower alkyl; and a herbicidal amount of a herbicidally active compound of the formula:

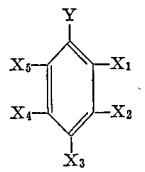

wherein $X_1$, $X_2$, $X_3$ and $X_4$ are independently selected from the group consisting of chlorine, methyl, and hydrogen; and $n$ is an integer from one to three; and the salts, amines and esters thereof.

3. A herbicidal composition including, as essential active constituents, a herbicidal amount of a compound of the formula:

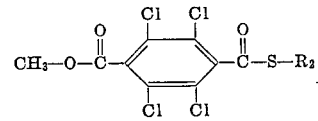

wherein $R_2$ is lower alkyl; and a herbicidal amount of a herbicidally active compound of the formula:

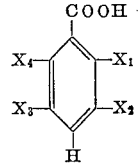

wherein $X_1$, $X_2$, $X_3$ and $X_4$ are independently selected from the group consisting of chlorine, methoxy, nitro, amino and hydrogen; and the salts, amides and esters thereof.

4. A herbicidal composition including, as essential active constituents, a herbicidal amount of a compound of the formula:

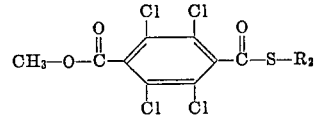

wherein $R_2$ is lower alkyl; and a herbicidal amount of a herbicidally active compound of the formula:

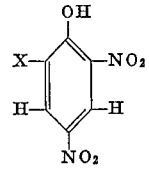

wherein X is selected from the group consisting of methyl, sec-butyl and sec-amyl; and the salts, amides and esters thereof.

5. A herbicidal composition comprising a herbicidal amount of a compound of the formula:

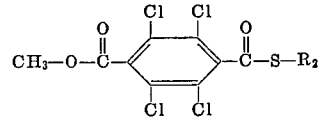

wherein $R_2$ is lower alkyl; and a herbicidal amount of a compound selected from the group consisting of 2,4-dichlorophenoxyacetic acid,
2,4,5-trichlorophenoxyacetic acid,
2-methyl-4-chlorophenoxyacetic acid,
3,4-dichlorophenoxyacetic acid,
p-chlorophenoxyacetic acid,
allyl 2-methyl-4-chlorophenoxyacetate,
2-(2-methyl-4-chlorophenoxy)propionic acid,
4-(2-methyl-4-chlorophenoxy)butyric acid,
2,3,6-trichlorobenzoic acid,
2,3,5,6-tetrachlorobenzoic acid,
2-methoxy-3,6-dichlorobenzoic acid,
2-methoxy-3,5,6-trichlorobenzoic acid,
3-amino-2,5-dichlorobenzoic acid,
3-nitro-2,5-dichlorobenzoic acid,
2-methoxy-3-nitro-5-chlorobenzoic acid and
2,4-dinitro-6-methylphenol,
2,4-dinitro-6-sec-butylphenol,
2,4-dinitro-6-sec-amylphenol and the salts, amides and esters thereof.

6. A herbicidal composition comprising a herbicidal amount of methyl S-methyl 2,3,5,6-tetrachloromonothio-terephthalate and a herbicidal amount of 2,4-dichlorophenoxyacetic acid.

7. A herbicidal composition comprising a herbicidal amount of methyl S-methyl 2,3,5,6-tetrachloromonothio-terephthalate and a herbicidal amount of 2,4,5-trichlorophenoxyacetic acid.

8. A herbicidal composition comprising a herbicidal amount of methyl S-methyl 2,3,5,6-tetrachloromonothio-terephthalate and a herbicidal amount of 2-methyl-4-chlorophenoxyacetic acid.

9. A herbicidal composition comprising a herbicidal amount of methyl S-methyl 2,3,5,6-tetrachloromonothio-terephthalate and a herbicidal amount of 2-(2-methyl-4-chlorophenoxy)propionic acid.

10. A herbicidal composition comprising a herbicidal amount of methyl S-methyl 2,3,5,6-tetrachloromonothio-terephthalate and a herbicidal amount of 4-(2-methyl-4-chlorophenoxy)butyric acid.

11. A herbicidal composition comprising a herbicidal amount of methyl S-methyl 2,3,5,6-tetrachloromonothio-terephalate and a herbicidal amount of allyl 2-methyl-4-chlorophenoxyacetate.

12. A herbicidal composition comprising a herbicidal amount of methyl S-methyl 2,3,5,6-tetrachloromonothio-terephthalate and a herbicidal amount of 2-methoxy-3,6-dichlorobenzoic acid.

13. A herbicidal composition comprising a herbicidal amount of methyl S-methyl 2,3,5,6-tetrachloromonothio-terephthalate and a herbicidal amount of 2-methoxy-3,5,6-trichlorobenzoic acid.

14. A herbicidal composition comprising a herbicidal amount of methyl S-methyl 2,3,5,6-tetrachloromonothio-terephthalate and a herbicidal amount of 2,4-dinitro-6-methylphenol.

15. A herbicidal composition comprising a herbicidal amount of methyl S-methyl 2,3,5,6-tetrachloromonothio-terephthalate and a herbicidal amount of 2,4-dinitro-6-sec-butylphenol.

16. A herbicidal composition comprising a herbicidal amount of methyl S-methyl 2,3,5,6-tetrachloromonothio-terephthalate and a herbicidal amount of 2,4-dinitro-6-sec-amylphenol.

17. A herbicidal composition comprising a herbicidal amount of methyl S-ethyl 2,3,5,6-tetrachloromonothio-terephthalate and a herbicidal amount of 2-methoxy-3,6-dichlorobenzoic acid.

18. A herbicidal composition comprising a herbicidal amount of methyl S-ethyl 2,3,5,6-tetrachloromonothio-terephthalate and a herbicidal amount of 2,4-dinitro-6-sec-butylphenol.

19. A herbicidal composition comprising a herbicidal amount of methyl S-ethyl 2,3,5,6-tetrachloromonothio-terephthalate and a herbicidal amount of 2,4-dinitro-6-sec-amylphenol.

20. A herbicidal composition comprising a herbicidal amount of methyl S-isopropyl 2,3,5,6-tetrachloromonothio terephthalate and a herbicidal amount of 2-methoxy-3,6-dichlorobenzoic acid.

21. A herbicidal composition comprising a herbicidal amount of methyl S-isopropyl 2,3,5,6-tetrachloromono-thioterephthalate and a herbicidal amount of 2,4-dinitro-6-sec-butylphenol.

22. A herbicidal composition comprising a herbicidal amount of methyl S-isopropyl 2,3,5,6-tetrachloromono-thioterephthalate and a herbicidal amount of 2,4-dinitro-6-sec-amylphenol.

References Cited

UNITED STATES PATENTS 3,201,220   8/1965   Harris et al. _____ 71—2.6

FOREIGN PATENTS 1,265,053   5/1961   France.

OTHER REFERENCES

Crafts, The Chemistry and Mode of Action of Herbicides, pp. 10 to 12, 55 to 59 (1961).

Southern Weed Conference, vol. 15 (1962), pages 121 to 126 (Limpel).

LEWIS GOTTS, *Primary Examiner.*

JAMES O. THOMAS, *Examiner.*

ALBERT J. ADAMCIK, *Assistant Examiner.*